June 16, 1953 — H. F. GRIFFIN ET AL — 2,642,034

TOOL JOINT LUBRICATOR

Filed Nov. 20, 1950

INVENTORS.
Harold F. Griffin,
BY Merrill C. Wright,

ATTORNEY.

Patented June 16, 1953

2,642,034

UNITED STATES PATENT OFFICE 2,642,034

TOOL JOINT LUBRICATOR

Harold F. Griffin and Merrill C. Wright, Houston, Tex., assignors, by mesne assignments, to Standard Oil Development Company, Elizabeth, N. J., a corporation of Delaware Application November 20, 1950, Serial No. 196,694

3 Claims. (Cl. 118—317)

The present invention is directed to a lubricating device and particularly to a device for greasing the threads of tool joint boxes for the drill pipe used in drilling oil wells.

The present invention will now be described in conjunction with the drawing, in which.

Figures 1, 2:
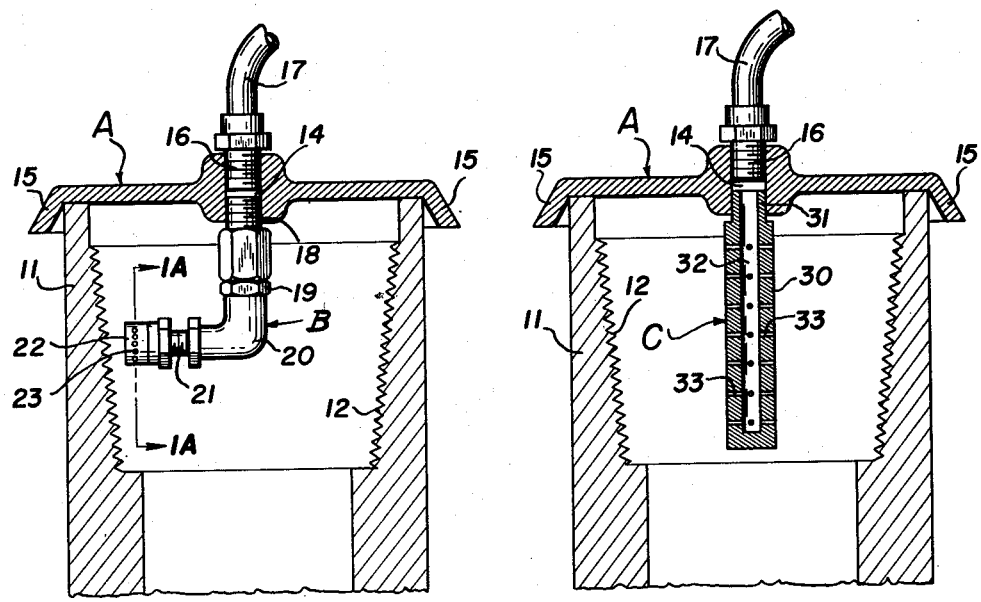
Fig. 1 is an elevation, partly in section, which illustrates one embodiment of the present invention.
Fig. 2 is an elevation, partly in section, which illustrates another embodiment of the present invention.
Figure 1A:
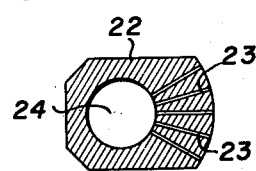
Fig. 1A is a sectional view taken along line 1A—1A of Fig. 1.

Turning now specifically to the drawing and first to Fig. 1, the embodiment of the present invention is shown in tool joint box 11 in position for greasing the threads 12 of the tool joint box. The device consists of a circular cover plate A which consists of a central portion provided with a threaded axial opening 14 and has an outer downwardly turned lip 15 at its outer periphery for making a substantially snug engagement with the outer periphery of the end of the tool joint box. A threaded nipple 16 is screwed into threaded opening 14 and has a flexible hose 17 secured thereto which is adapted to be secured to a grease gun, not shown in the drawing. Secured to the lower side of the threaded opening 14 is assembly B consisting of a nipple 18 having a swivel joint 19 secured thereto and below the swivel joint is an elbow 20. Secured to the elbow 20 by nipple 21 is grease fitting 22 which has a plurality of perforations 23 connecting with axial passage 24. The perforations 23 make an angle of 90 degrees with the axis of passage 24 and have more or less the configuration of a fan so that they will give a substantially uniform spray onto the threads 12 of the tool joint box 11.

When grease is forced under pressure into hose 17 and thence through the central passage defined by members 16, 18, 19, 20 and 21, and discharged through perforations 23 as a spray, the reaction of the grease as it discharges from perforations 23 causes the portion of the apparatus below swivel 19, that is elbow 20, nipple 21 and spray head 22, to rotate in a clockwise direction (when looking down on tool joint 11) which insures that the entire surface of the threads 12 will receive a coating of grease.

Another embodiment of the present invention is shown in Fig. 2. In this embodiment the tool joint box and the plate A are identical with the embodiment of Fig. 1 and will not again be described in detail. Unit C consists of a tubular member 30 with its upper end provided with threads 31 and a central passage 32 from which a multiplicity of spaced small perforations 33 extend at right angles to the axis thereof. Member 30 is attached to the lower side of threaded opening 16 by its threads 31.

In the use of the device of Fig. 2 grease is forced through hose 17 under pressure and passes down through central passage 32 and discharges through perforations 33. The multiplicity of passages 33 causes the grease ejected therefrom to form a spray distributed throughout the circumference and length of the threads 12 of tool joint box 11.

Figures 3, 4:
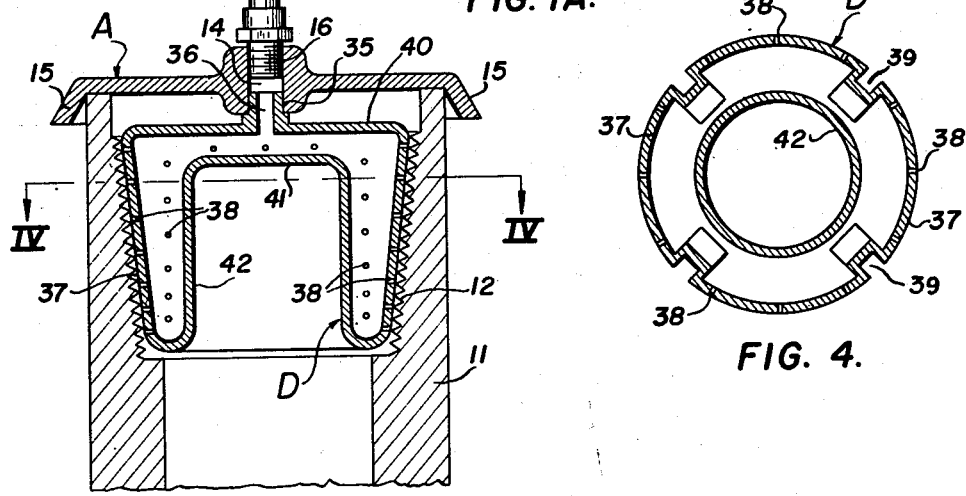
Fig. 3 is an elevation, partly in section, which shows a third embodiment of the present invention.
Fig. 4 is a view taken along line IV—IV of Fig. 3.

Another embodiment of the present invention is shown in Figs. 3 and 4. In this embodiment the tool joint box and member A are identical with the two preceding figures and hence will not be described in detail. In this embodiment a member D is provided for distributing the grease on the threads of the tool joint. Member D is a hollow body with a threaded fitting 35 secured to its upper portion and screwed into the threaded opening 14 of plate A and defining a passage 36 which leads into the interior of the body. The exterior wall 37 of member D is in the shape of a plug which fits snugly against the lands of threads 12 of the tool joint box 11, that is the surface is tapered downwardly and inwardly with the same taper used for the tool joint threads. This exterior wall 37 is provided with a multiplicity of perforations 38 distributed throughout the circumference and longitudinally. In order to allow mud or other objects in the tool joint to be expelled as grease is forced into the tool joint from perforations 38, longitudinally extending passages 39 are provided in the exterior wall 37. Connecting the exterior wall 37 with fitting 35 is an upper flat surface 40. It is preferred to form body D so that its weight and capacity to retain grease are at a minimum consistent with adequate distribution of the grease through the multitude of perforations. Accordingly, an inner cylindrical member having an end 41 and cylindrical walls 42 is arranged to connect with the lower ends of the exterior plug-shaped wall 37. In cross-sectional view the device has somewhat the appearance of an inverted U, the grease being forced downwardly first through the axial passage and then through an annular passage before it is distributed to the multiple perforations 38.

The device of Figs. 3 and 4 is particularly adapted to be used for inserting grease in a tool joint box where foreign bodies, such as drilling mud, fill the box at the time it is to be greased. The device of Figs. 3 and 4 may be inserted in such a box and grease then expelled through the multiplicity of perforations 38. As the plug-shaped wall 37 makes contact with the lands of the threads, the grease from perforations 38 is compelled to enter the threaded portion of the joint and the mud or other objects in the joint is expelled by the grease.

The embodiments of the present invention which have been described and illustrated will allow a box tool joint to be greased readily and effectively and at the same time protect the operator from contact with the grease and mud while the operation is being performed.

While I have described and illustrated preferred embodiments of the present invention, it will be obvious to a workman skilled in the art that changes may be made in the sizes, shapes and proportions of the parts without departing from the scope of the invention.

Having fully described and illustrated embodiments of the present invention, what I desire to claim as new and useful and to secure by Letters Patent is:

1. A device for greasing a tool joint box comprising, in combination, a cover plate of generally circular shape having a threaded axial opening with the outer edge thereof in the shape of a downwardly depending lip for making a snug fit with the exterior surface of the end of said tool joint, a flexible hose connected to the threaded axial opening on the upper side of said cover plate, a plug member having its outer surface in the shape of a frustrum of a cone tapering downwardly and inwardly to make a snug fit with the tapered threads of the tool joint and having a multiplicity of radial perforations extending through the exterior wall thereof and distributed substantially uniformly circumferentially and longitudinally throughout the area of said outer surface, the exterior surface of said plug member defining at least one longitudinal passage to allow the discharge of foreign matter when grease is discharged through said perforations onto the threads of said tool joint box, the lower end of said plug being closed to form a cavity and its upper end having a threaded portion screwed into the lower end of said threaded axial opening.

2. A device in accordance with claim 1 in which the plug portion of the device consists of an exterior wall member in the shape of a frustrum or a cone and an interior cylinder wall member having its upper end closed and its lower edge connected with the lower end of said conical member, the two wall members defining a cavity having a circular upper portion and a depending annular portion.

3. A device for greasing a tool joint box comprising, in combination, a cover plate of generally circular shape having an inlet opening with the outer edge of said cover plate in the shape of a downwardly depending lip for making a snug fit with the exterior surface of the end of said tool joint box, a plug member mechanically secured to said cover plate and having its outer surface tapering downwardly and inwardly to make a snug fit with the tapered threads of the tool joint box and having a multiplicity of radial perforations extending through the exterior wall thereof and distributed substantially uniformly circumferentially and longitudinally throughout the area of said outer surface, the exterior surface of said plug member defining at least one longitudinal passage to allow the discharge of foreign matter when grease is discharged through said perforations onto the threads of said tool joint box, the lower end of said plug being closed to form a cavity and its upper end being in fluid communication with said inlet opening of said cover plate.

HAROLD F. GRIFFIN.
MERRILL C. WRIGHT.

References Cited in the file of this patent
UNITED STATES PATENTS

| Number | Name | Date |
| --- | --- | --- |
| 1,384,048 | Coates | July 12, 1921 |
| 2,322,211 | Albright | June 22, 1943 |
| 2,324,455 | Keim et al. | July 13, 1943 |
| 2,370,775 | Capita | Mar. 6, 1945 |
| 2,386,079 | Weiskopf | Oct. 2, 1945 |
| 2,412,954 | Zdancewicz | Dec. 24, 1946 |
| 2,480,663 | McNab | Aug. 30, 1949 |